Figure 1:
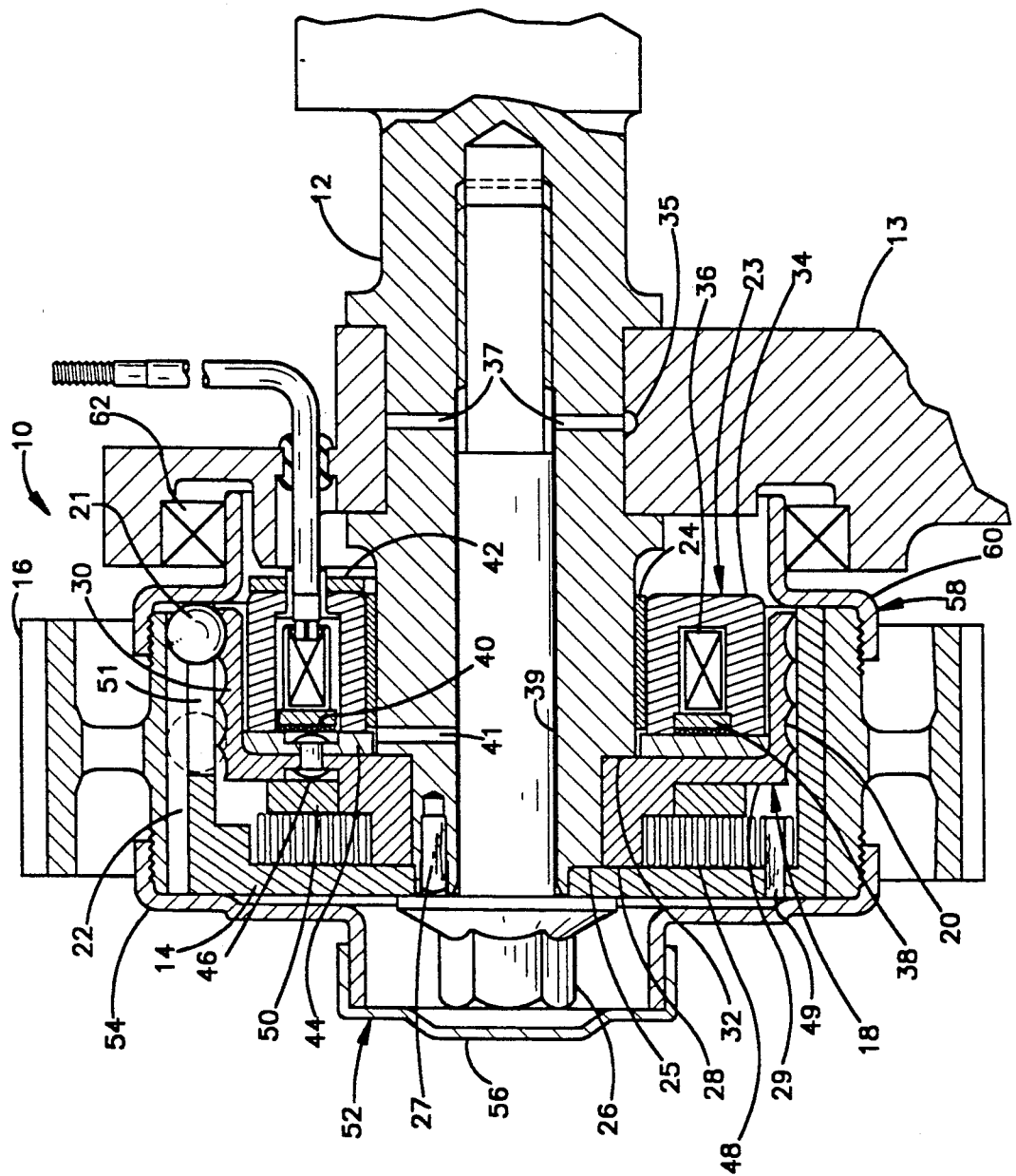

United States Patent
Brune et al.

Patent Number: 5,172,661
Date of Patent: Dec. 22, 1992

[54] VARIABLE CAM PHASING DEVICE

[75] Inventors: John E. Brune, Parma; Darryl J. Muir, Bellevue; James K. Day, Chelsea, all of Mich.

[73] Assignee: Eaton Corporation, Cleveland, Ohio

[21] Appl. No.: 854,152

[22] Filed: Mar. 20, 1992

[51] Int. Cl.$^5$ .............................................. F01L 1/34
[52] U.S. Cl. ................... 123/90.17; 123/90.31; 464/2
[58] Field of Search ............... 123/90.15, 90.17, 90.31; 464/1, 2, 160

[56] References Cited

U.S. PATENT DOCUMENTS

| | | | |
|---|---|---|---|
| 3,685,499 | 8/1972 | Meacham et al. | 123/90.15 |
| 4,513,724 | 4/1985 | Kamleitner | 464/1 |
| 4,548,182 | 10/1985 | Kamleitner | 464/2 |
| 4,561,390 | 12/1985 | Nakamura et al. | 123/90.17 |
| 4,754,727 | 7/1988 | Hampton | 123/90.15 |
| 4,841,924 | 6/1989 | Hampton et al. | 123/90.15 |
| 5,031,585 | 7/1991 | Muir et al. | 123/90.17 |
| 5,078,647 | 1/1992 | Hampton | 123/90.17 |
| 5,097,804 | 3/1992 | Brune et al. | 123/90.17 |

FOREIGN PATENT DOCUMENTS

| | | | |
|---|---|---|---|
| 3438088 | 4/1986 | Fed. Rep. of Germany | 123/90.15 |
| 450132 | 3/1913 | France | 464/1 |
| 30408 | 2/1985 | Japan | 123/90.31 |

Primary Examiner—Tony M. Argenbright
Assistant Examiner—Weilun Lo
Attorney, Agent, or Firm—F. M. Sajovec

[57] ABSTRACT

A phase change device of the type wherein a phase change is effected between an input member and an output member in response to the axial movement of an advancing element interconnecting the input member and the output member, and wherein such axial movement is effected by retarding the rotation of a drum member engaged with the advancing element. A grooved thread is formed in the drum member, and a plurality of balls carried in slots formed in the output member are received in the thread and in helical grooves formed in the input member to effect the relative rotation between the input and output members as the balls advance axially along the thread in response to retardation of the drum member.

5 Claims, 1 Drawing Sheet

VARIABLE CAM PHASING DEVICE

This invention relates to a device for varying the angular phase relation between two rotating shafts. More specifically, the invention relates to such a device adapted to vary the angular phase relation between the crankshaft and a camshaft of an internal combustion engine.

Devices for varying or changing the angular phase relation or timing between an engine camshaft and crankshaft are well known, as may be seen by reference to U.S. Pat. No. 5,031,585 and U.S. patent application Ser. No. 775,671 filed Oct. 11, 1991, which are assigned to the assignee of this patent and which are incorporated herein by reference.

U.S. Pat. No. 5,031,585 to Muir et al discloses a device wherein an axially displaceable advancing plate drivingly interconnects input and output members through angled or helical surfaces formed on interfacing portions of such input and output members. The advancing plate is also threadably mounted on a drum for axial displacement along the drum in response to relative rotation between the drum and advancing plate. Relative rotation in one direction is provided by a spring reacting between the hub and drum, and in the other direction by selective actuation of a brake to retard the rotation of the drum counter to the spring force. In this device, the input member has a first set of lugs formed thereon which interfit with a first set of slots formed in the advancing member, and the output member has a second set of lugs formed thereon which interfit with a second set of slots formed in the advancing member. The first lugs and slots are formed with straight interfitting surfaces such that a constant angular relationship is maintained between the input and the advancing member as the advancing member moves axially with respect to the input. The second lugs and slots are formed with angled interfitting surfaces such that the angular relationship between the advancing member and the output member varies as the advancing member moves axially with respect to the output. In accordance with other prior art devices of similar type, both sets of lugs and slots can be formed with angled surfaces, which is effective to increase the degree of angular displacement between the input and output members. Also in accordance with the prior art, the angled interfitting surfaces of the lugs and slots can be helical.

In the device disclosed in U.S. patent application Ser. No. 775,671, the lug and slot engagement surfaces of the above are replaced with interfitting balls and grooves wherein helical grooves are formed in the input and output members and interfit with a plurality of balls carried by the advancing member. In this device, as in the device disclosed in U.S. Pat. No. 5,031,585, the advancing plate is threadably mounted on the drum for axial displacement along the drum in response to relative rotation between the drum and the advancing plate.

The present invention is an improvement to the above devices wherein the advancing plate is eliminated and replaced by forming a radially grooved thread in the drum member and forming angled or helical slots in the hub member, which slots receive a plurality of balls interfitting with the grooved thread in the drum member and with helical or angled grooves formed in the input member. Accordingly, when rotation of the drum relative to the hub is retarded, the balls are caused to move axially by virtue of their engagement with the thread, such axial movement resulting in relative angular movement between the input member and the hub (output member) thus effecting the required phase change between the input and output.

The inventive design proves several advantages over prior art designs. In addition to the elimination of the advancing plate, the change from mating square-threaded members to a ball operating in a grooved thread reduces friction and thus reduces the actuation forces required. The elimination of the advancing plate permits the input member to be supported by the full width of the hub member, thus increasing stiffness, permitting higher loads and reducing lash between the input and the cam.

Another advantage of the invention which is made possible by the above features is the addition of a brake disc member which is separate from the drum and which can be low carbon steel or other material having optimum magnetic properties. This improves the disengaging characteristics of the brake by reducing hysteresis, thus reducing the spring force required, and in turn reducing the braking torque required.

Other advantages of the invention will be apparent from the following description when considered in connection with the accompanying drawing, the single figure of which is a cross-sectional view of a camshaft phase change device incorporating the invention.

Referring to the drawing, there is illustrated an angular phase change device 10 adapted to be fixed to and rotate about a camshaft 12 of an internal combustion engine 13. As is well known in the art, the engine includes a crankshaft which rotates the device 10 and camshaft 12. The camshaft controls the opening and closing of the intake and/or exhaust valves of the engine in known manner. Device 10 includes a hub 14 mounted for rotation with the camshaft 12; a drive member 16 which is driven by the engine crankshaft, or by another camshaft in the case of a twin cam engine, and which is engaged with the hub 14 in a variable phase relationship therewith; a drum 18 mounted for rotation on the camshaft 12 and having a grooved thread 20 formed therein; a plurality of balls 21 carried by the hub and received in the thread 20 and in a groove 22 formed in the drive member 16; and a stationary brake assembly 24 which is supported on the camshaft on a bearing 24 and which is operable to apply a retarding force to the drum.

The hub 14 is an essentially annular member having a radially extending portion located against a shoulder formed on the camshaft 12 and is fixed for rotation with the camshaft by an elongated bolt 26. A dowel pin 27 received through a hole in the end of the camshaft and in a slot in the hub 14 maintains timing between the camshaft and the hub.

The drive member 16 is the input to the phase change device 10, and is illustrated herein as a toothed pulley, although it can be appreciated that the input can also be a gear or a sprocket.

The drum 18 comprises an axially extending portion 28 mounted for rotation on the camshaft, a radially extending portion 29, and a drum portion 30 on which the threads 20 are formed. The axial position of the drum 18 relative to the hub 14 is maintained by the dimension between the hub and a shoulder 32 formed on the camshaft.

The brake assembly 23 comprises a housing 34 in the form of an annular channel member, a coil 36, a backing plate 38 formed of a non-magnetic material and press-fit or staked into the open end of the housing, friction member 40 adhered to the plate 38, and a mounting bracket 42 welded or otherwise fixed to the housing and attached (not shown) in known manner to the engine.

In accordance, with one aspect of the invention, a brake disc 44 engageable by the friction member 40 is fixed to the radial portion 29 of the drum by means of rivets 46. The disc 44 is preferably made of low carbon steel, the magnetic properties of which significantly improve the efficiency of the brake assembly as compared with prior art units.

The brake assembly operates in a wet mode and receives engine oil via an oil port 35 in the engine 13, radial ports 37 formed in the camshaft 12, an annular channel defined by a clearance space 39 between the shank portion of the bolt 26 and the camshaft, and a radial port 41 in the vicinity of the brake.

In accordance with the known operation of the phase change device, axial movement of the balls 21 which results in relative angular rotation between the drive member 16 and the hub 14 is produced by retarding the rotation of the drum 18 with respect to the hub 14 by the brake assembly 23. The drum 18 and the hub 14 are interconnected by a clockspring 48 which is hooked over a pin 49 received in the hub and which is attached at its other end to a second pin (not shown) received in the drum. Stop member 50 is mounted on the drum 18 for rotation therewith and limits rotation of the drum with respect to the hub. Details of the operation of a stop member such as that shown here are described in U.S. Pat. No 5,031,585, which is incorporated herein by reference. The clockspring biases the drum relative to the hub in the position illustrated wherein the balls 21 are advanced along the threads 20 to their rightward-most position relative to the drum 18, the drive member 16 and the hub 14. In the preferred embodiment, there are three balls 21, one each retained in helical slots 51 formed in the hub 14.

The phase change assembly 10 is mounted on the front of the engine block on an extended portion of the camshaft and is effectively enclosed within the drive member 16. The enclosure is defined by a first end cap assembly 52 including an end plate 54 which is threaded or otherwise fixed to the front of the drive member, and a cap 56 which is pressed onto an axially-extending portion of the plate 54; and a second end cap assembly 58 including end plate 60 threaded or otherwise fixed to the rear of the drive member and a dynamic seal element 62 received between an axially-extending portion of the plate 60 and the engine 13.

For purposes of illustration the relative positions of the various elements shown in the drawing are considered to represent a base or first phase relationship between the drive member 16 and the hub 14, and thus between the crankshaft and the camshaft 12. When a change in the phase relationship between the crankshaft and camshaft is desired, the brake assembly 23 is energized to retard the rotation of the drum 20 relative to the hub 14 and against the force of spring 48, such retardation causing the balls 21 to move axially leftward along the thread 20. By virtue of the engagement of the balls 21 with helical slot 51 and helical groove 22, the axial movement of the balls 21 cause the drive member to rotate relative to the hub, thus effectively changing the phase relationship between the crankshaft and the camshaft.

We claim:

1. In a phase change device for an internal combustion engine comprising an input member; an output member; advancing means interconnecting the input and output member, said advancing means being operative upon axial movement thereof to effect limited relative rotation between the input and output member; drum means engaged with said advancing means to effect said axial movement of said advancing means when a retarding force is applied to said drum means; and actuating means operable to apply said retarding force; the improvement wherein said drum means has a thread formed thereon; said advancing means comprises one or more balls carried by said output member and received in said thread; and said input member includes one or more grooves formed therein; said grooves being engageable with said one or more balls.

2. Apparatus as claimed in claim 1, in which said output member includes one or more axially disposed, helical slots formed therein, said balls being carried by said slots.

3. Apparatus as claimed in claim 1, wherein said one or more grooves formed in said input member are helical.

4. Apparatus as claimed in any of claims 1, 2 or 3, including enclosure means providing an oil tight seal between said phase change device and said engine.

5. Apparatus as claimed in claim 4, in which said enclosure means comprises cap means fixed to said input member remote from said engine, a tubular member fixed to said input member adjacent said engine, and dynamic seal means received between said tubular member and said engine.

* * * * *